(12) United States Patent
Secours et al.

(10) Patent No.: US 12,515,084 B2
(45) Date of Patent: Jan. 6, 2026

(54) MULTILAYERED TEXTILE AS/FOR DURABLE AND WASHABLE HIGH-PERFORMANCE FILTRATION MEDIA AND METHOD OF ASSEMBLING THEREOF

(71) Applicant: Michelle Secours, Caplan (CA)

(72) Inventors: Michelle Secours, Caplan (CA); Monique Dumas-Quesnel, Paspébiac (CA); Antoine Palangié, Montreal (CA)

(73) Assignee: Frett Solutions, Caplan (CA)

( * ) Notice: Subject to any disclaimer, the term of this patent is extended or adjusted under 35 U.S.C. 154(b) by 442 days.

(21) Appl. No.: 17/912,259

(22) PCT Filed: Apr. 20, 2021

(86) PCT No.: PCT/CA2021/050539
§ 371 (c)(1),
(2) Date: Sep. 16, 2022

(87) PCT Pub. No.: WO2021/212219
PCT Pub. Date: Oct. 28, 2021

(65) Prior Publication Data
US 2023/0135994 A1    May 4, 2023

Related U.S. Application Data

(60) Provisional application No. 63/012,349, filed on Apr. 20, 2020.

(51) Int. Cl.
*A41D 13/11* (2006.01)
*A62B 23/02* (2006.01)
(Continued)

(52) U.S. Cl.
CPC ........ *A62B 23/025* (2013.01); *B01D 39/1623* (2013.01); *B01D 39/18* (2013.01);
(Continued)

(58) Field of Classification Search
CPC ............ A41D 13/1107; A41D 13/1161; A62B 23/025; A62B 23/02; B01D 39/083; B01D 39/1623
See application file for complete search history.

(56) References Cited

U.S. PATENT DOCUMENTS 5,320,891 A      6/1994  Levy et al.
5,699,792 A  *  12/1997  Reese ................. A41D 13/1184
                                                          128/207.11
(Continued)

FOREIGN PATENT DOCUMENTS

CA         2014052 A1    10/1990
CN         1089546        7/1994
(Continued)

*Primary Examiner* — Camtu T Nguyen
(74) *Attorney, Agent, or Firm* — DECODE LEGAL INC.; Danny Higgins

(57) ABSTRACT

A list of highly suitable textiles and a method to combine them into a durable reusable filtration medium with high particles filtration efficiency (PFE) and breathability that lasts over 50-75 laundering cycles. Filtration medium achieves PFE only through mechanical means, without fragile and harmful physicochemical pre-treatments. Different textiles are assembled considering their individual breathability and their complementary in terms of PFE on different particles' sizes to achieve good breathability and high PFE on a large range (20 nm-4 μm) after many laundering cycles, or several layers of the same textile are paired, while varying the fibers' orientation and dimensions in each layer to increase efficiency. This assembling method highly improves PFE, service life and performances' stability of the filtration medium by addressing structural weaknesses linked to anisotropy in each layer, and by protecting their fine fibers from mechanical wear and clogging through a face-to-face closed filtration cell-type pairing.

17 Claims, 12 Drawing Sheets

(51) Int. Cl.
  *B01D 39/16* (2006.01)
  *B01D 39/18* (2006.01)
  *B01D 46/10* (2006.01)
(52) U.S. Cl.
  CPC ........ *B01D 46/10* (2013.01); *B01D 2239/025* (2013.01); *B01D 2239/0618* (2013.01); *B01D 2239/0622* (2013.01); *B01D 2239/0681* (2013.01); *B01D 2239/10* (2013.01)

(56) References Cited

U.S. PATENT DOCUMENTS

| | | | |
|---|---|---|---|
| 5,934,275 A * | 8/1999 | Gazzara | A41D 13/1115 128/206.13 |
| 6,139,308 A | 10/2000 | Berrigan et al. | |
| 10,660,385 B2 * | 5/2020 | Nagao | A41D 13/1161 |
| 11,083,231 B1 * | 8/2021 | Lewis | A41D 13/1176 |
| 2004/0074593 A1 | 4/2004 | Schild et al. | |
| 2008/0073294 A1 | 3/2008 | Zambianchi et al. | |
| 2008/0110469 A1 * | 5/2008 | Weinberg | A41D 13/1176 128/206.25 |
| 2016/0213960 A1 | 7/2016 | Crotty et al. | |
| 2017/0107651 A1 | 4/2017 | Zhao et al. | |
| 2020/0009409 A1 | 1/2020 | Crotty et al. | |

FOREIGN PATENT DOCUMENTS

| | | |
|---|---|---|
| CN | 1251397 | 4/2000 |
| CN | 1342229 | 3/2002 |
| CN | 101076388 | 11/2007 |
| CN | 206714154 U | 12/2017 |
| CN | 110201454 A | 9/2019 |
| CN | 108368653 A | 11/2021 |
| EP | 0030418 A1 | 6/1981 |
| EP | 0030418 B1 | 5/1983 |
| EP | 0391726 | 10/1990 |
| JP | 2015183327 | 10/2015 |
| WO | 2016052401 | 4/2016 |
| WO | 2019112522 | 6/2019 |

\* cited by examiner

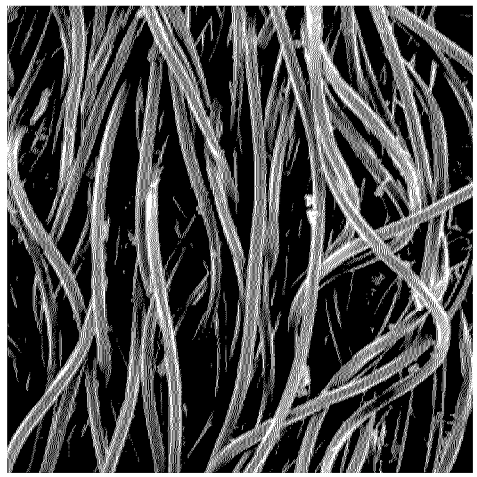
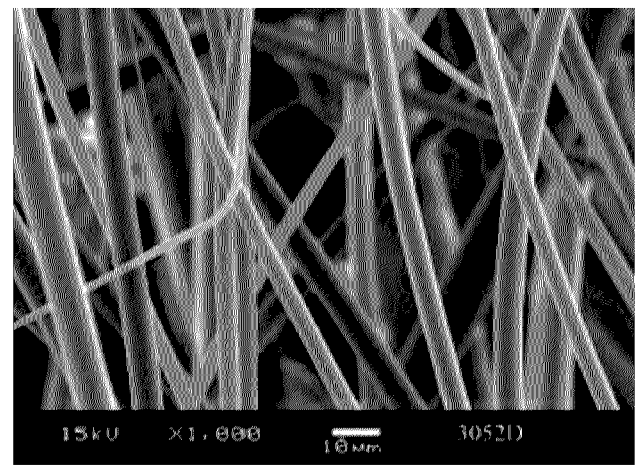
FIG. 19      FIG. 20
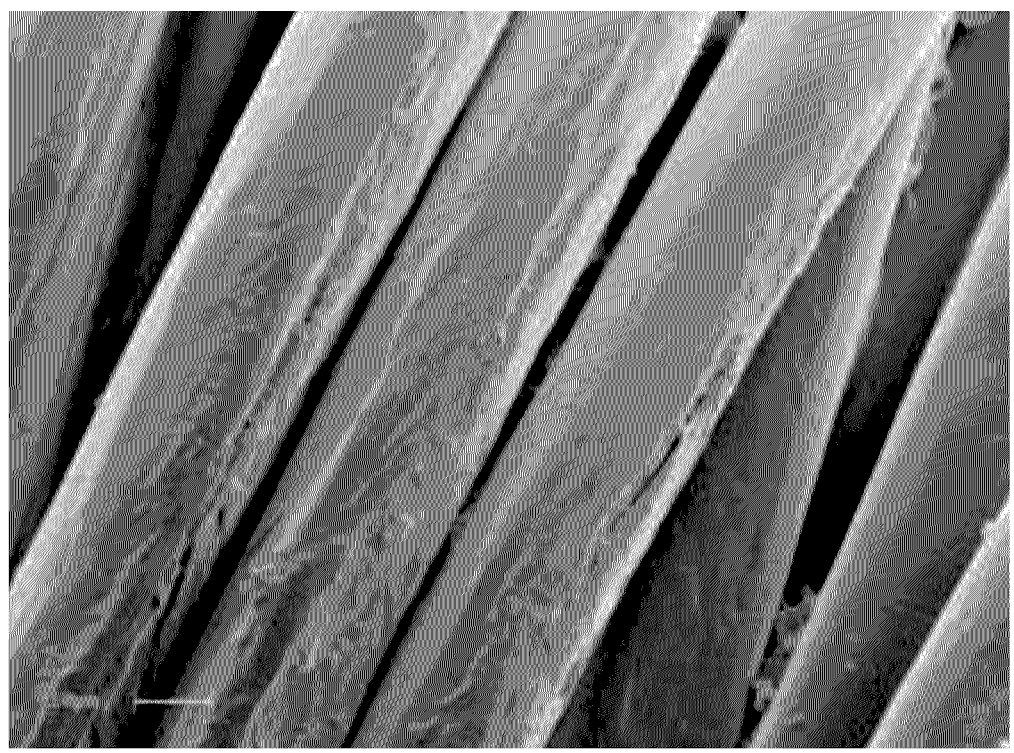
FIG.21

MULTILAYERED TEXTILE AS/FOR DURABLE AND WASHABLE HIGH-PERFORMANCE FILTRATION MEDIA AND METHOD OF ASSEMBLING THEREOF

CROSS-REFERENCE TO RELATED APPLICATION

This application claims priority from U.S. provisional patent application 63/012,349 filed Apr. 20, 2020, the specification of which is hereby incorporated herein by reference in its entirety.

BACKGROUND (a) Field

The subject matter disclosed generally relates to filtration media for masks and other applications, wherein the filtration media is adapted to limit the transmission of solid and liquid particles such as dust, soot, smoke, pollen, microbes, viruses and droplets. More particularly, the subject matter disclosed relates to the nature of materials composing such a filtration medium, and mode of assembling thereof.

(b) Related Prior Art

In the field of such filtration media, in a pandemic situation, as in any condition wherein the wear of a mask or other personal protective equipment (PPE) is advised either in order to limit the transmission of microbes and viruses, aka biological pathogens, to persons present in the environment of the wearer, or on the contrary from being in contact with biological pathogens a person may infect a wearer with, many solutions have been developed over the years from medical-level masks to dust-controlling masks and even the use of common textiles in the fabrication of scarf-type masks.

In situation of illnesses and pandemics, it is frequent that public services require the population to wear such a barrier mask to limit the transfer of the biological pathogens, with variable efficiency. As a result, such masks are not fully available to the public in some situations, providing more fictional than real results, among other problems.

Furthermore, the masks that are the most commonly worn today are of surgical or medical type. They are providing high particles filtration efficiency (PFE) over a large range of sizes (between 20 nm and 4 µm), high breathability and comfort, are made of synthetic fibers prepared with physicochemical treatments (e.g. coatings, antibiotic substances, electrostatic charging) that quickly fade away in contact with moisture and water. They consequently have to be changed after a maximum of 4 hr, and cannot be washed without losing their qualities. Regarding masks today, single-use plastic is thus the norm, generating heavy environmental costs through massive amounts of very harmful, hardly recyclable and long-lasting waste after a short service life (such masks taking 450 years to break down into even more harmful microplastics released in all ecosystems).

In the present time of pandemics, this situation has turned from concerning to critical, with 47 000 single-use masks being thrown away every second worldwide (130 billion per month).

Furthermore, some of the fibers' physicochemical treatments for enhancing the masks' performances such as chlorine, metallic ions, nanoparticles like graphene, are hazardous to human health especially in close contact with the face and the respiratory tract.

Further impacts linked to the use of single-use masks are financial through the considerable costs for frequent replacements and disposal according to regulations: in the health services, used masks are considered biohazardous waste and must not be simply thrown away, but rather processed accordingly.

To face that situation, artisanal and commercial washable masks made of common textile have become available to the general population. While they help to alleviate the volume of waste generated by the increased use of PPE, they display major disadvantages, namely weak PFE over fine particles (5% to 20% in the 20-800 nm range) while providing decent filtration over large-size particles (over 2-3 µm). Furthermore, they become structurally instable after only a few cleaning cycles, decreasing even further their filtration abilities. Attempts to correct that situation mostly result in the breathability of the masks dropping dramatically, degrading thereby the comfort of the wearer, leading people to either not wearing or wearing the masks incorrectly.

There is therefore a need for durable reusable filtration media, used in e.g., masks, that provide high performance in filtration and breathability (defined by low $\Delta P$, or differential pressure), while overcoming the economic, public health and environmental downfalls of the single-use medical masks and artisanal and commercial masks.

SUMMARY

According to an embodiment, there is provided a filtration medium for filtering particles within a range of particle sizes, the filtration medium comprising: a first piece of textile having a first fiber orientation of predominance; a second piece of textile superposed to the first piece of textile, the second piece of textile having second fiber orientation of predominance; and sealing along the peripheric edge the first piece of textile superposed to second piece of textile to define the filtration medium. The first piece of textile and the second piece of textile are superposed with their fiber orientations of predominance being non-aligned relative to each other thereby together having a filtration medium of better isotropy than any one of the first piece of textile and the piece of second textile alone.

According to an aspect, the first piece of textile and the second piece of textile are of same or different textiles.

According to an aspect, the first piece of textile is one of the following textile: a nonwoven textile of between 10 gsm and 50 gsm or 51 gsm and 90 gsm; a melt-blown textile of between 10 gsm and 50 gsm or 51 gsm and 90 gsm; a textile of nanofibers, microfibers or combination thereof of between 10 gsm and 50 gsm or 51 gsm and 90 gsm comprising short and long fine fibers; nonwoven felt of short fibers, long fibers or combination thereof of between 40 gsm and 300 gsm; a calendered nylon microperforated or nanoperforated textile and/or polymer; and a paper-textile made of at least one of cellulose, polyester and polypropylene.

According to an aspect, the first piece of textile and the second piece of textile taken together provides fibers of a variety of diameters and lengths.

According to an aspect, the first textile is a nonwoven textile having a first structural side and a first fragile-fiber side, and the second textile having a second structural side and a second fragile-fiber side. The first fragile-fiber side faces the second fragile-fiber side.

According to an aspect, the first piece of textile is a melt-blown having a first structural side and a first fragile-fiber side. The first fragile-fiber side is facing and superposed on any side of the second piece of textile and the two pieces of textiles are sealed together along a peripheric edge defining an enclosure for the fragile-fiber side of the first piece of textile.

According to an aspect, the filtration medium further comprises at least a third piece of textile. The third piece of textile has a third fragile-fiber side facing and superposed on the first structural side of the first piece of textile; or the third piece of textile has a third fragile-fiber side facing and superposed on the fragile-fiber side of the first or second piece of textile.

According to an aspect, the filtration medium further comprises at least a third and a fourth pieces of textile. The third piece of textile has a third fragile-fiber side facing and superposed on a fourth fragile-fiber side of the fourth piece of textile defining forming together a unit of two superposed pieces of textiles which unit is superposed on the first structural fiber side or the second structural fiber side or is positioned in between the first and second fragile-fiber sides; or the fourth piece of textile has a fourth fragile-fiber side facing and superposed on a third structural fiber side of the third piece of textile defining forming together a unit of two superposed pieces of textiles which unit is superposed on the first structural fiber side or the second structural fiber side or in between the first and second fragile-fiber sides.

According to an aspect, the filtration medium further comprises at least a third, a fourth and a fifth pieces of textile. The third piece of textile has a third fragile-fiber side facing and superposed on a fourth fragile-fiber side of the fourth piece of textile defining forming together a unit of two superposed pieces of textiles which unit is superposed on the first structural fiber side or the second structural fiber side or is positioned in between the first and second fragile-fiber sides; and the fifth piece of textile has a fifth fragile-fiber side facing and superposed on a structural fiber side of any piece of textile positioned on an outside surface or is positioned in between the first and second fragile-fiber sides or between the third and fourth fragile-fiber sides; or the fourth piece of textile has a fourth fragile-fiber side facing and superposed on a third structural fiber side of the third piece of textile defining forming together a unit of two superposed pieces of textiles which unit is superposed on the first structural fiber side or the second structural fiber side or in between the first and second fragile-fiber sides; and the fifth piece of textile fifth fragile-fiber side facing and superposed on a structural fiber side of any piece of textile positioned on an outside surface or is positioned in between the first and second pieces of textile or between the third and fourth pieces of textile.

According to an aspect, the filtration medium further comprises a third piece of textile comprising a protective weft protecting the first textile.

According to an aspect, the filtration medium features a pressure loss of less than 8.55 mm $H_2O$ per $cm^2$ according to EN14683:2019 method According to an aspect, the superposed pieces of textile are sealed together along a peripheric edge.

According to an aspect, the pieces of textile are sealed together by one of sewing, peripheral binding, glue, thermofusion and ultrasound fusion.

According to an aspect, the filtration medium has a loss over its filtration characteristics of less than 40% after 25 cleaning cycles.

According to an aspect, the filtration medium has a loss over its filtration characteristics of less than 44% after 50 cleaning cycles.

According to an aspect, the filtration medium has a loss over its filtration characteristics of less than 50% after 100 cleaning cycles.

According to an embodiment, there is provided a barrier mask adapted to be placed over a wearer's face in front of the wearer's mouth and nostrils for filtration of particles including biological pathogens, the barrier mask comprises at least one of a mask inner layer or a mask outer layer; a filtration layer comprising the filtration medium described herein. The filtration layer and at least one of the inner layer and the outer layer are superposed and sealed together to form a barrier mask. At least one of a fastening member selected from the group consisting of ear loops and elastic band adapted to rest on a wearer's head which fastening member is attached to the barrier mask to maintain same over the wearer's face for filtration of the particles therethrough.

According to an embodiment, there is provided a filtration device mounted to air-forced mechanical filtration device for filtration of particles in air, comprising the filtration medium described herein.

According to an embodiment, there is provided a piece of cloth, a garment or a garment accessory comprising the filtration medium described herein.

According to an embodiment, there is provided a method of making a filtration layer for filtration of particles, comprising superimposing a first piece of textile and a second piece of textile each having a fiber orientation of predominance with their fiber orientations of predominance being non-aligned relative to each other of at least 10 degrees thereby having together a filtration medium of better isotropy than any one of the first piece of textile and the second textile alone.

According to an aspect, the first piece of textile and the second piece of textile are of same or different textiles.

According to an aspect, the first textile is a nonwoven having a structural side and a fragile-fiber side, and wherein the fragile-fiber side of the first piece of textile faces the fragile-fiber side of the second piece of textile.

According to an aspect, the method is for the preparation of the filtration medium wherein either the first textile is the nonwoven textile of the aspect described hereinbefore, the first piece of textile is a nonwoven textile of the aspect described hereinbefore, further comprises at least a third piece of textile of the aspect described hereinbefore, further comprises at least a third and a fourth piece of textile of the aspect described hereinbefore, or further comprises a third, a fourth and a fifth piece of textile of the aspect described hereinbefore.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 19-22 are close-up views of fibers of typical melt-blown textiles depicting their respective fiber orientation of predominance.

It will be noted that throughout the appended drawings, like features are identified by like reference numerals.

DETAILED DESCRIPTION

Figure 1:
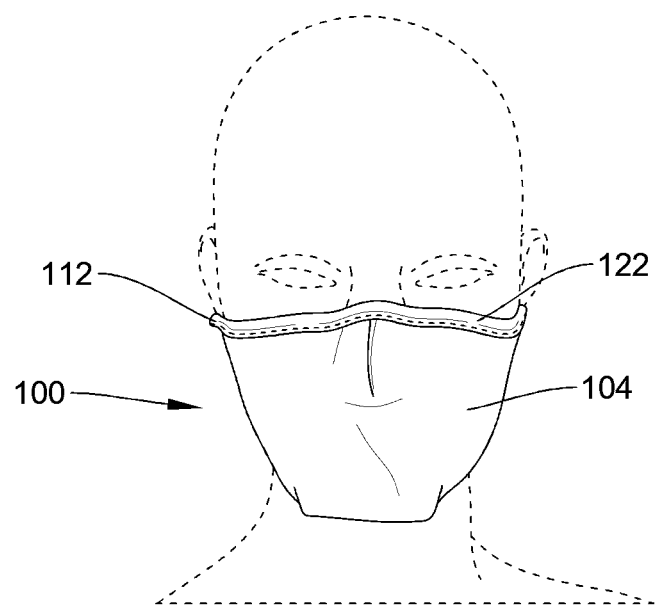
FIGS. 1-4 are respectively a front view, a side view, a view from a lower elevation and a top view of a barrier mask worn over the face of a typical wearer in accordance with an embodiment.
Figure 2:
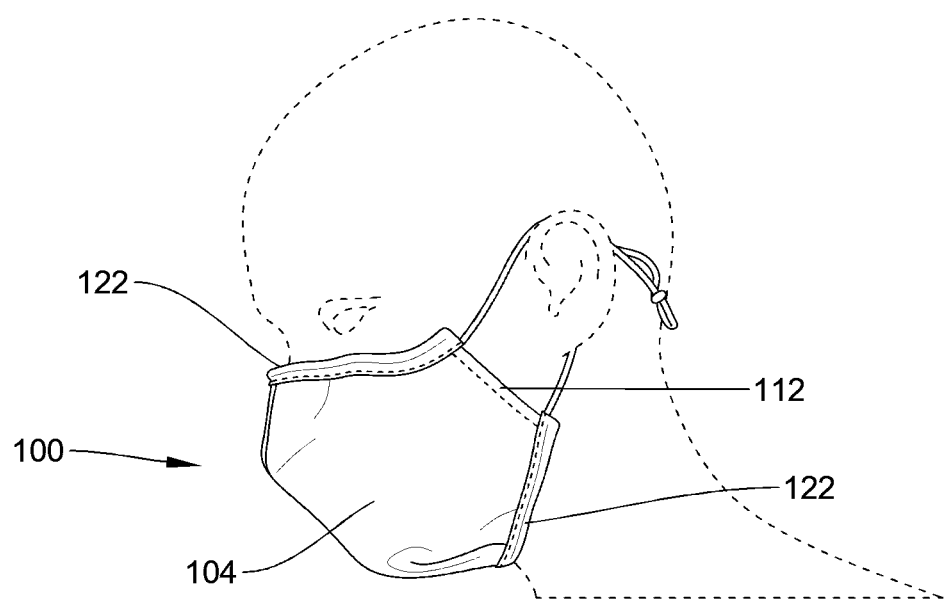
Figure 3:
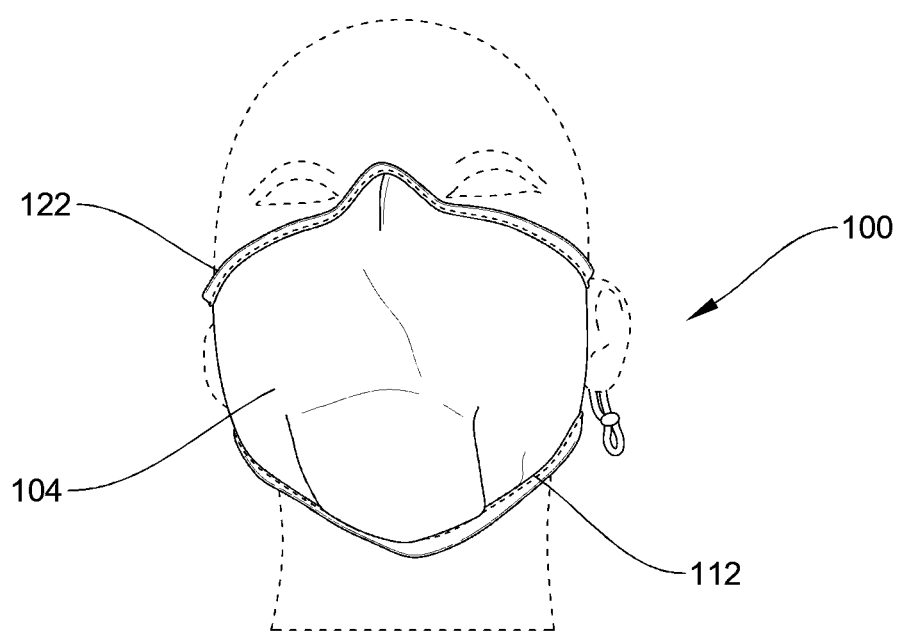
Figure 4:
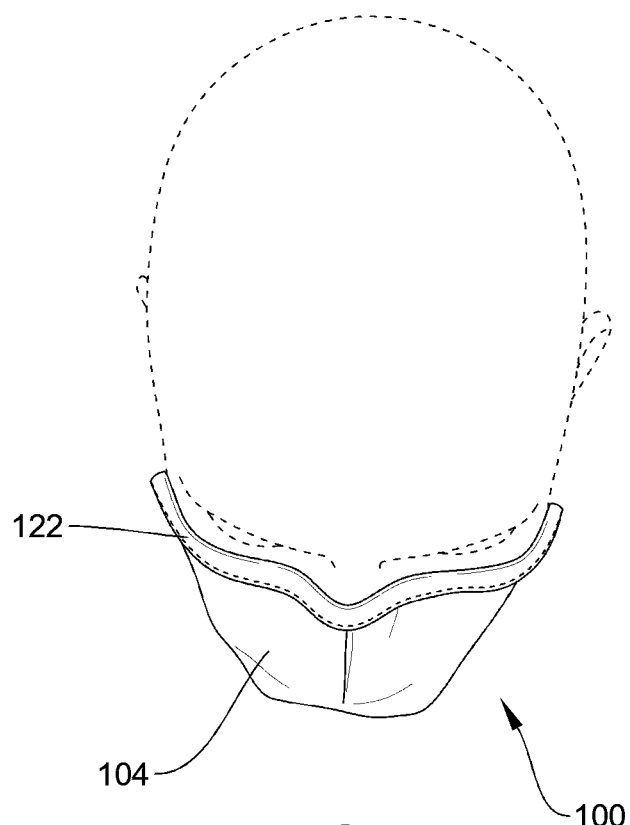
Figure 5:
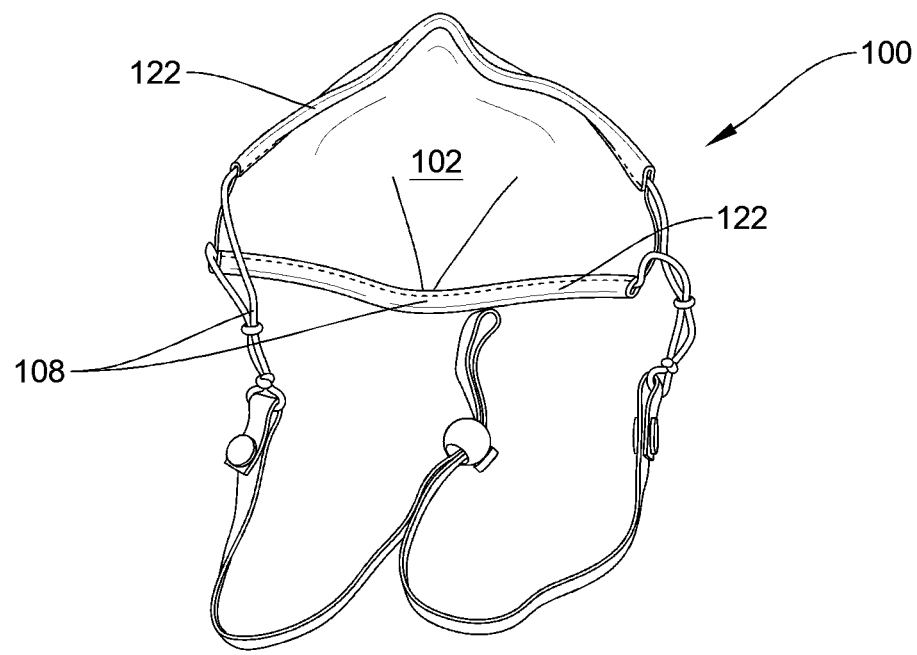
FIGS. 5 and 6 are rear views of the barrier mask worn of FIGS. 1-4 respectively with a neck elastic strap and without the neck elastic strap.
Figure 6:
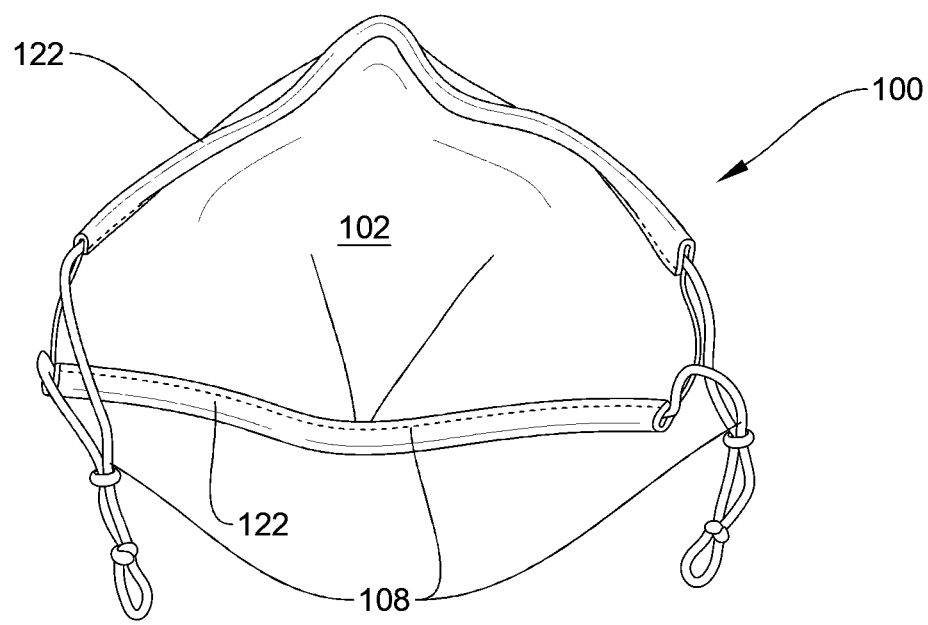
Figure 7:
FIGS. 7 and 8 are a side view of a metallic wire and a close-up view of the wire of FIG. 7 from the mask of FIGS. 1-4.
Figure 8:
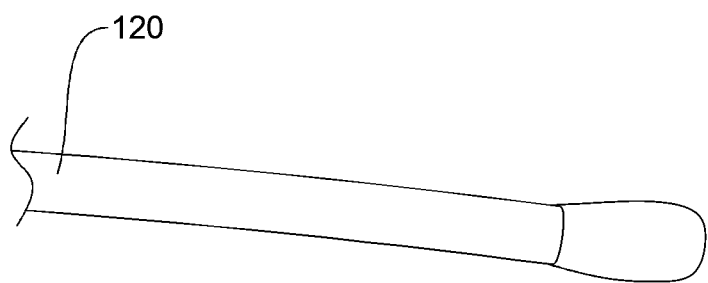

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product, with indication of normal orientation of the components being provided on FIGS. 1 to 4 with the barrier mask 100 being worn.

In embodiments, there are disclosed details of a barrier mask.

It will be noted that throughout the appended drawings, like features are identified by like reference numerals.

The barrier mask is adapted to be worn either directly on the face of the wearer or over another mask, e.g., a medical mask or respirator used by surgeons during operations, for better limiting transmissions of biological pathogens and other types of particles.

Figure 13:
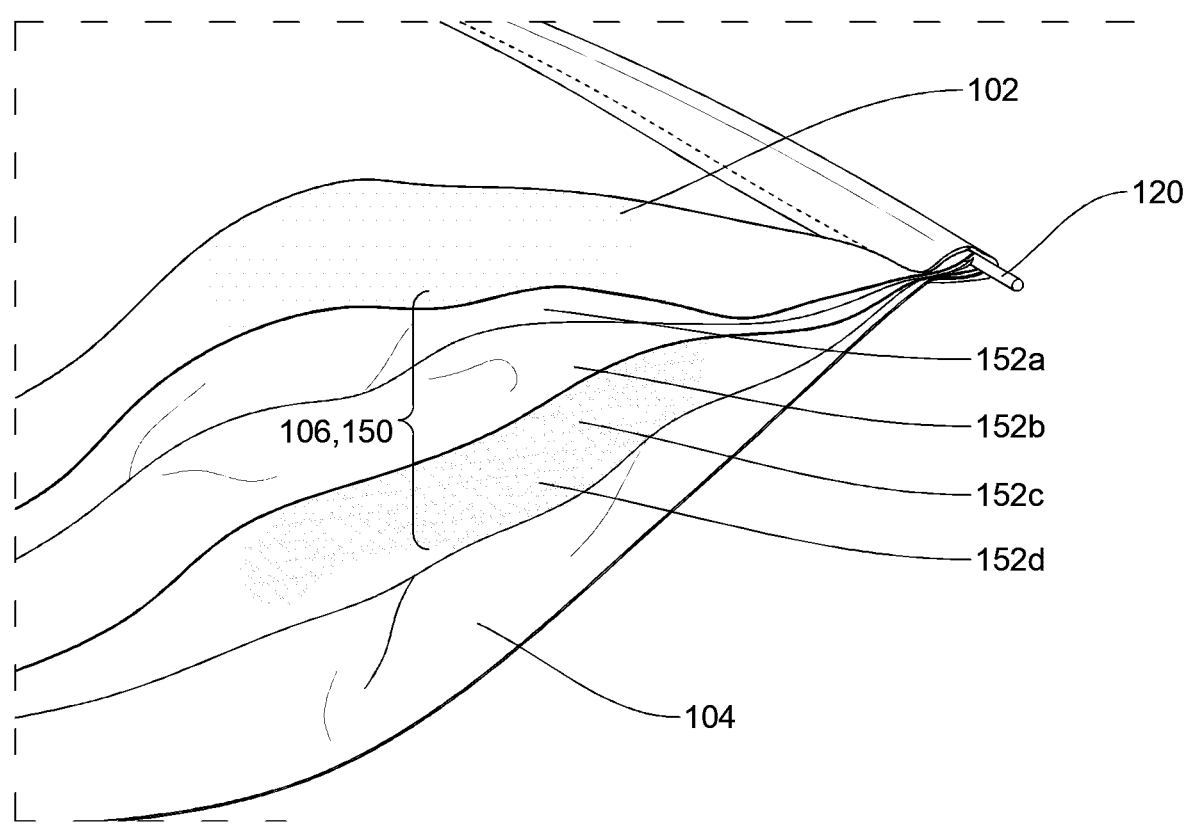
FIG. 13 is a side view of layers of a mask in accordance with an embodiment.

Referring now to FIGS. 1 to 8, the barrier mask 100 is made of an inner layer 102 (FIGS. 5 and 13) touching the skin of wearer, an outer layer 104 and a filtration layer 106 (FIG. 13). Typically, the inner layer 102 is made of material that is selected for its texture and composition to prevent irritation of the wearer having the textile of the inner layer 102 touching their skin.

According to realizations, the inner layer 102 may be made of natural textile, or even of a synthetic textile having both the desired softness and the necessary air permeability for the breath of the wearer to easily pass through the textile. The inner layer can also provide an augmentation of filtration, a barrier to humidity thereby providing improved comfort and safety to the wearer and their environment.

Regarding the outer layer 104, the variety of usable textiles is broader than for the inner layer 102 since the outer layer 104 is not intended to be continuously touching the skin of the wearer. Selection of the textile for the outer layer 104 is thus based on the textile featuring, like the textile for the inner layer 102, breathability.

The filtration layer 106 is made of a textile specifically selected for its interaction with biological pathogens and other particles, e.g., pollution and pollen.

Accordingly, regardless of the embodiments, the filtration layer 106 is preferably made of a combination of at least two pieces of textiles, e.g., a nonwoven 100% polypropylene textile with another textile such as cotton, geotextile, polyester and cellulose, to list a few, with other examples provided hereafter.

The barrier mask 100 is typically manufactured through the assembly of the inner layer 102, the filtration layer 106 and the outer layer 104 by joining the edges of the layers 102, 104, 106 by for example sewing the three layers 102, 104, 106 together along the peripheric edge 112 of the layers 102, 104, 106 or using another bounding solution. In all cases, the layers 102, 104, 106 are free of sewing where the barrier mask 100 is intended to cover the mouth and the nostrils since the sewing would provide a path through the filtration layer 106 for the particles such as biological pathogens, and any other kind of bonding in the same area would reduce the available section for air passing through, thus reducing the breathability.

According to embodiments, ear loops or elastic band around the head 108 are also sewed (or stapled) along with the layers 102, 104, 106 for keeping the barrier mask 100 in place when worn.

Figure 9:
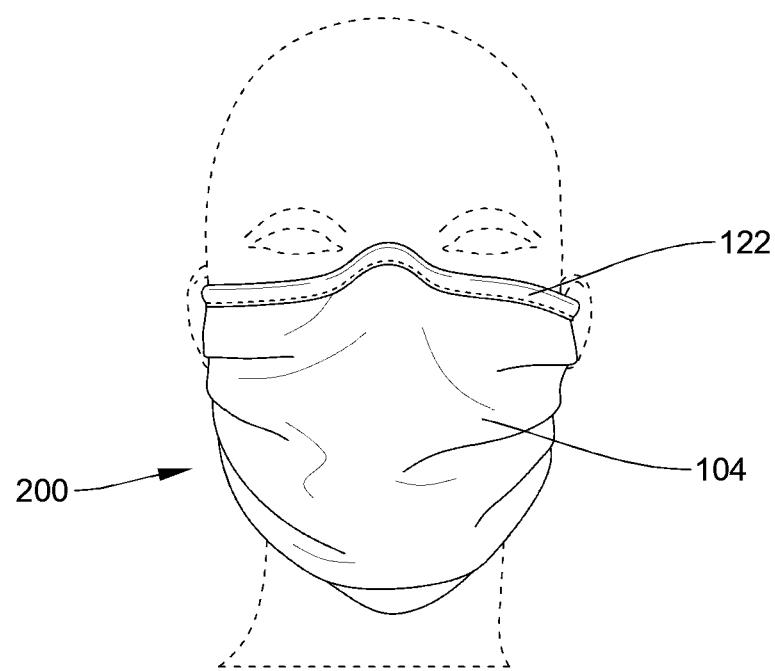
FIGS. 9-12 are a front view, a front view from a lower elevation, a side view and a top view of a mask in accordance with another embodiment.
Figure 10:
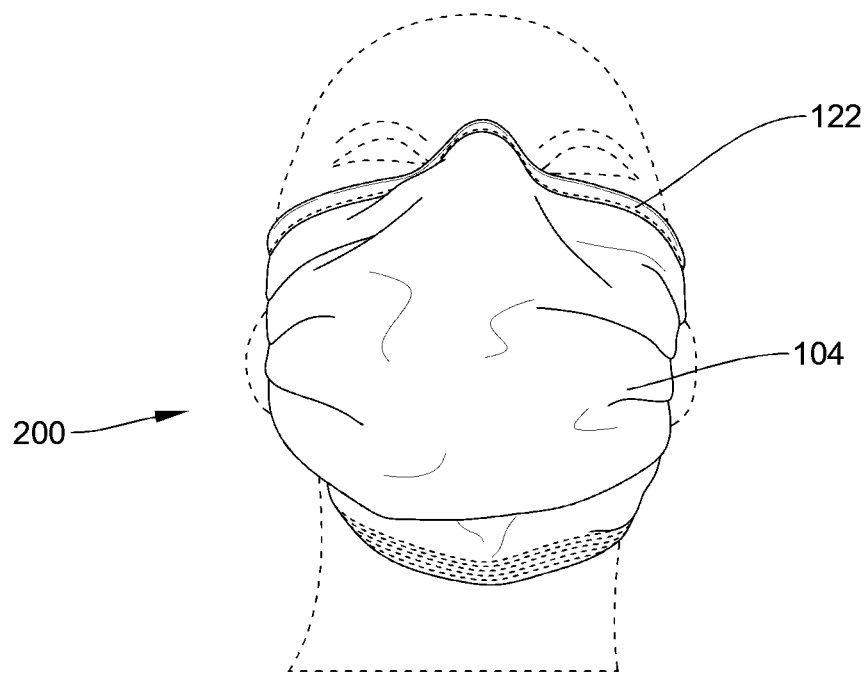
Figure 11:
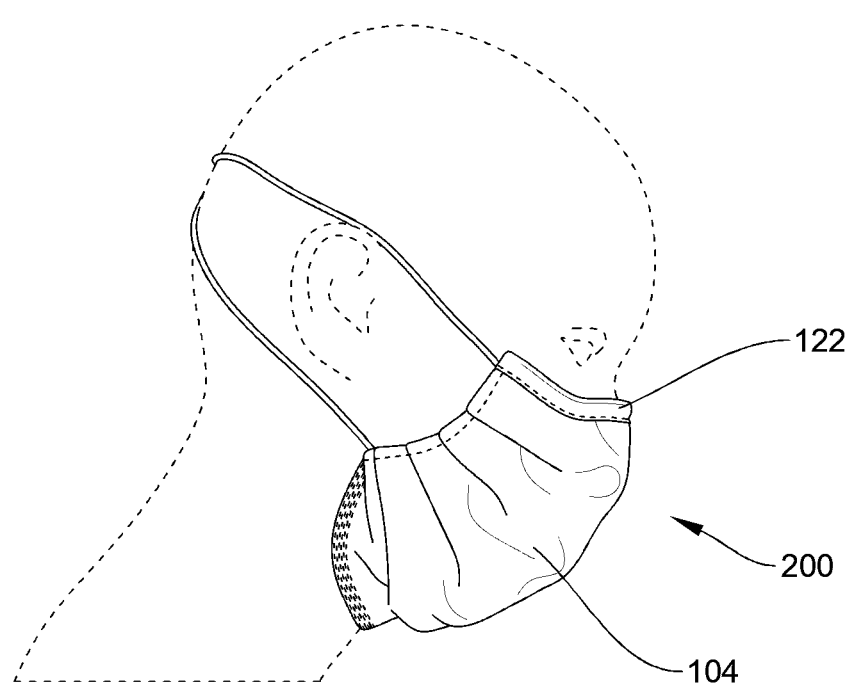
Figure 12:
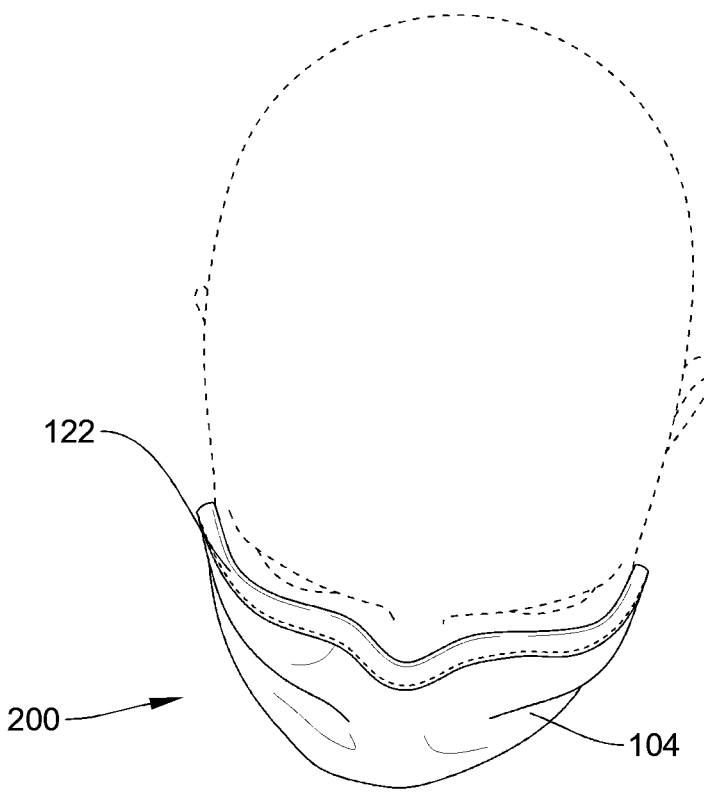

According to embodiments, the barrier mask 100 may also comprise malleable components, such as a metallic wire or strip over the top of the nose for allowing the wearer to shape the top of the barrier mask 100 to fit to a portion, and preferably the whole width of the wearer's face, and more particularly the shape of the nose and the cheekbones. Preferably, the malleable component consists in a metallic wire 120 (FIGS. 8 and 9), and preferably a copper gained wire.

According to another embodiment, the barrier mask 100 comprises an inner layer 102 and an outer layer 104 that are joined together such as to provide an aperture for easily inserting in a filtration layer 106 and removing the filtration layer 106 from the inset space located in-between the layers 102 and 104.

Referring to FIGS. 9 to 12, another embodiment of a mask 200 comprises an inner layer 102, an outer layer 104, and a filtration layer 106, wherein the mask 200 differs from the mask 100 in at least the mask 200 featuring different pleats for comfort of the wearer and generating a 3D effect that ensures improved clearance between the inner layer 102 and the skin of the wearer in front of the mouth and nostrils. More precisely, the mask 200 features 5 pleats and no sewing associated therewith, so the mask 200 provides a good fit to the shape of the wearer's face without featuring the openings, thus weaknesses to the filtration efficiency, sewing would induce.

Both masks 100, 200 feature a neoprene-made binding 122 to improve comfort of the wearer, wherein the binding may be elastic to improve airtightness of the mask 100, 200 and house the metallic wire 120, e.g., copper gained wire.

In all cases, the design of masks 100, 200 are made to avoid sewing lines, the sewing lines weakening the filtration performances of the masks 100, 200.

According to the textiles used for the different layers 102, 104 and 106, the barrier mask 100, 200 are adapted to be cleaned repetitively without losing their filtration characteristics.

Cleaning methods may include soap and warm or hot water (according to instructions), treatment with hydrogen peroxide vapors, dry heat and infrared sterilization, and using an autoclave at a preset temperature to treat the barrier mask 100, 200. Alternative cleaning methods further comprise plasma treatment, UV and microwaves.

Referring now particularly to FIG. 13, according to realizations, the filtration medium 150 according to the present description provides a solution to replace masks used in medical applications and masks used in domestic and workplace applications. The filtration medium 150 presents the following characteristics:

A mask of High Performance type regarding PFE over a large range of particle sizes (e.g., 20-4000 nm).

It should be noted that the laboratories are testing filtration media for a single size or a narrow range of particle sizes to fulfill requirements of a filtration standards. For instance, according to standard F2100 of ASTM, filtration media are tested over 100 nm particles. According to standard F3502-21 of ASTM, filtration media are tested over 75 nm particles.

Since the filtration process results in diverse and interlapping physical phenomena including interception by mechanical filtration, inertia and kinetic energy of the particles, electrostatic and Van der Waals forces, each media will perform differently in regard to particle sizes because of its properties. It thus proves very difficult to obtain a filtration medium that displays excellent characteristics over a large range of particle sizes. Furthermore, in the context of filtration, breathability must remain high otherwise the filtration medium rapidly becomes an enclosure, which is opposed to the objective.

Another characteristic of the filtration medium 150 involves the flexibility of the method allowing to selectively adopt a solution to fulfill specific filtration and breathability requirements.

Another characteristic of the masks 100, 200 using the filtration medium 150 involves the protection of the environment from the wearer as well as the protection of the wearer from the environment provided by the mask since the filtration medium 150 is adapted to filter a large range of particle sizes, and the design of the mask provides a good airtightness forcing air to move through the filtration medium 150.

Another characteristic of the filtration medium 150 of the present description relates to its breathability, the filtration medium 150 and the mask comprising the filtration medium 150 generating a low pressure loss, aka ΔP.

Another characteristic is its stability over numerous cleaning cycles. The losses of filtration characteristics of the filtration medium 150 are less than 2-40% over 25 cleaning cycles. Preferably, losses of filtration characteristics are less than 3-44% over 40 cleaning cycles. Preferably, losses of filtration characteristics are less than 3-45% over 50 cleaning cycles. Preferably, losses of filtration characteristics are less than 3-48%, over 75 cleaning cycles. Preferably, losses of filtration characteristics are less than 3-50% over 100 cleaning cycles.

The filtration medium 150 are cleanable with currently available cleaning devices, such as a domestic laundry washer.

As a result of the capacity of the filtration medium 150 to keep its filtration characteristics over a substantial number of cleaning cycles, matter ending in landfills substantially decrease. One mask comprising the present filtration medium replaces more than 100, preferably more than 200, and probably about 300 single-use masks. Accordingly, the volume of plastic-based waste is decreased about up to 100-fold. Economically, the costs of such mask per usage is also decreased up to between 4-fold and 30-fold.

Furthermore, the filtration medium 150 using mechanical filtration only requires no additional artifice (e.g., electrostatic treatment, coatings), thus thereby avoiding the efficiency to decrease or even the loss of efficiency of the usual masks when going through cleaning cycles.

Furthermore, the filtration medium 150 presents no risk to the wearer in relation to the inhalation of fibers or harmful materials or chemical products emitted by the filtration medium.

According to a realization, a barrier mask 100, 200 comprising the present filtration medium 150 comprises outer layer 104; the outer layer 104 being preferably made of a hydrophobic textile that do not induce an important hinderance against the breathability of the barrier mask 100, 200.

The barrier mask 100, 200 further comprise an inner layer 102; the inner layer 102 contacting the skin of the wearer, and providing a good absorption capacity relative to humidity, specifically to limit the humidity from the breath reaching the filtration medium 150 and improving the comfort of the wearer. Like the outer layer 104, the inner layer 102 should not induce an important hinderance against the breathability of the barrier mask 100, 200. The textile of the inner layer 102 is selected to be soft and non-toxic, thus fulfilling the desired characteristics.

The barrier mask 100, 200 further comprises a filtration layer 106 made of the present filtration medium 150, wherein the components and assembly of the components of the filtration medium 150 are selected based on the sought filtration characteristics.

According to a realization, the filtration medium 150 is made of at least two pieces of textiles 152, hereinafter textiles unless otherwise specified in relation with the type or nature of the textiles, wherein the two pieces of assembled together (see example of FIG. 13 with four textiles 152a, 152b, 152c and 152d).

Figure 14:
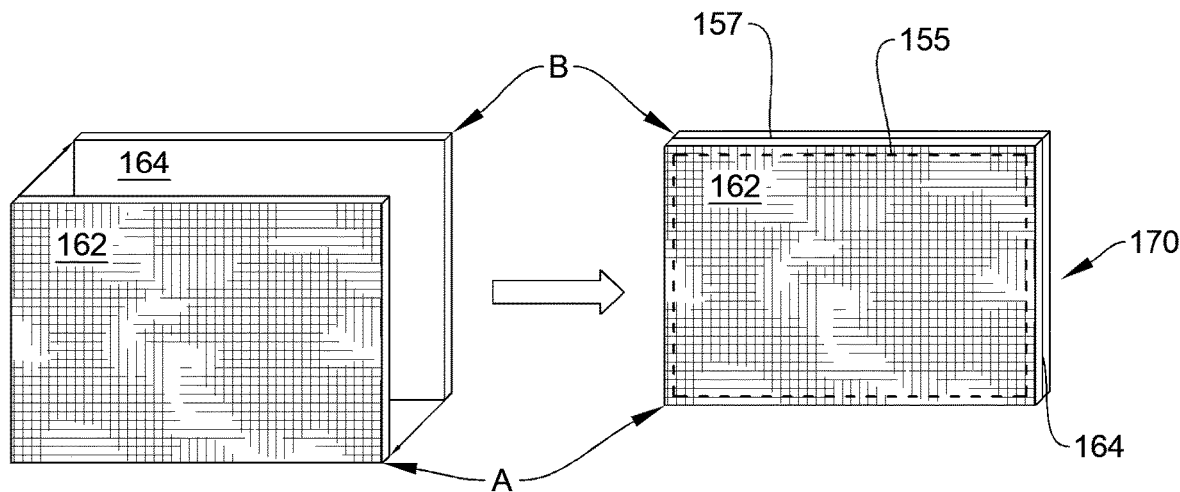
FIGS. 14-17 are exemplary embodiments of assemblies of two to five pieces of textiles of a filtration layer in accordance with embodiments.

Preferably, at least one of the textiles 152 comprise a fragile-fiber side and a structural side 162. For example, a melt-blown textile, hereinafter also called melt-blown, comprising a weft (FIG. 14) or canvas with fibers (FIG. 14) projected on one side, and thus comprising a structural side 162 (the weft) and a fragile-fiber side 164 (the side of projected fibers).

Referring now to FIGS. 14 to 17, according to a realization, two melt-blown A and B (FIG. 14) are assembled with the fragile-fiber side 164 of the melt-blown, the side where more fragile fibers sensible to detachment under exterior forces are present, being mounted face-to-face, thereby, according to tribology principles, decreasing the wear of the filtration medium 150 over cleaning cycles and over general movements causing friction on the filtration medium 150. Furthermore, the research and development performed in relation with the present filtration media showed that having two melt-blown with face-to-face fragile-fiber side 164 results in a portion of the melt-blown fibers fusing with each other over the washings (felt effect), thereby resulting in additional decrease of premature wear of the melt-blown by relative friction over time.

Preferably, two nonwoven, and more preferably two melt-blown are assembled permanently, and preferably over the perimeter 155 of the filtration medium 150, thereby limiting the sources of friction over the fragile-fiber side 164 of the melt-blown and defining an enclosure preventing the fibers to detach from the weft or from the structural side or to be degraded.

Preferably, the permanent assembly provides a seal, thereby preventing fibers enclosed to exit the enclosure formed by the assembly thereof. Accordingly, if fibers detach from their textile, they remain in the sealed enclosure and continue thus participating in the filtration characteristics of the filtration medium 150.

Accordingly, an advantage is the fibers remaining in the sealed enclosure rather than getting lost in the environment (thus having harmful impacts) or being inhaled by the wearer.

According to a realization, the assembly of the two melt-blown is performed with stiches 157. According to alternative realizations, alternative solutions for assembling the textiles of the filtration medium comprises mechanical fastenings such a peripheral binding, and chemical bonding such as glue, thermofusion or ultrasound fusion.

In another realization (not depicted), the filtration medium comprises a melt-blown and a protective layer, wherein the fiber side 164 of the melt-blown is facing the protective layer and wherein the protective layer is selected to limit the wear of the fiber side of the melt-blown over time. Accordingly, the protective layer is selected based on maximum level of similarities between the face of protective layer facing the melt-blown and the fiber side 164 of the melt-blown, and particularly regarding characteristics such as hardness, structure and other mechanical characteristics of the textiles.

Figure 15:
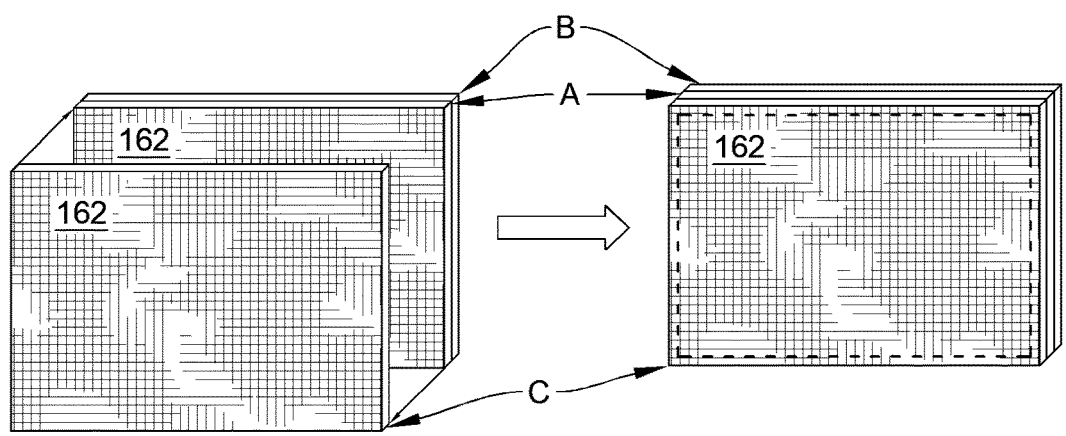
Figure 16:
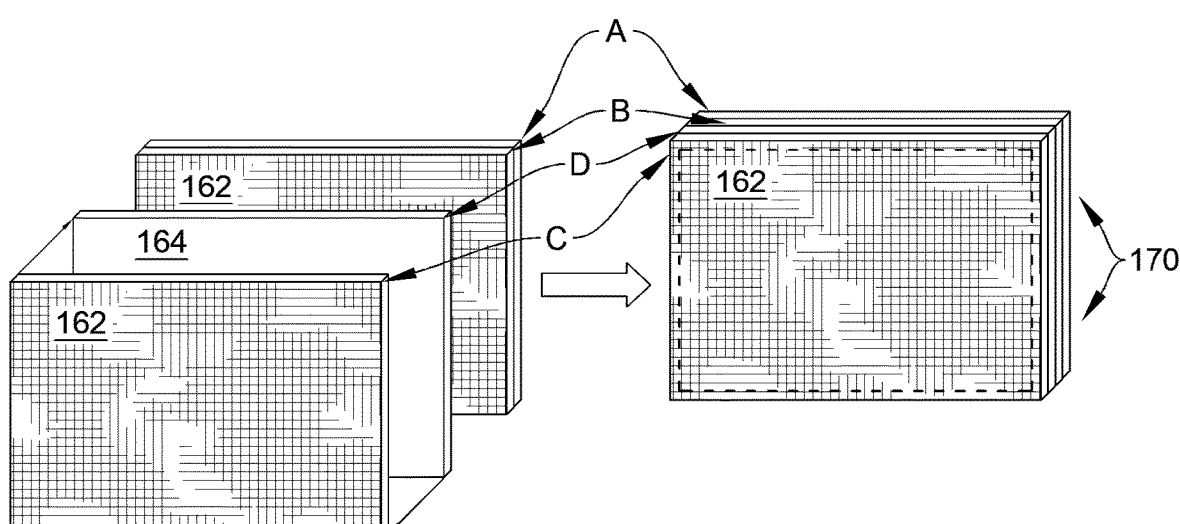
Figure 17:
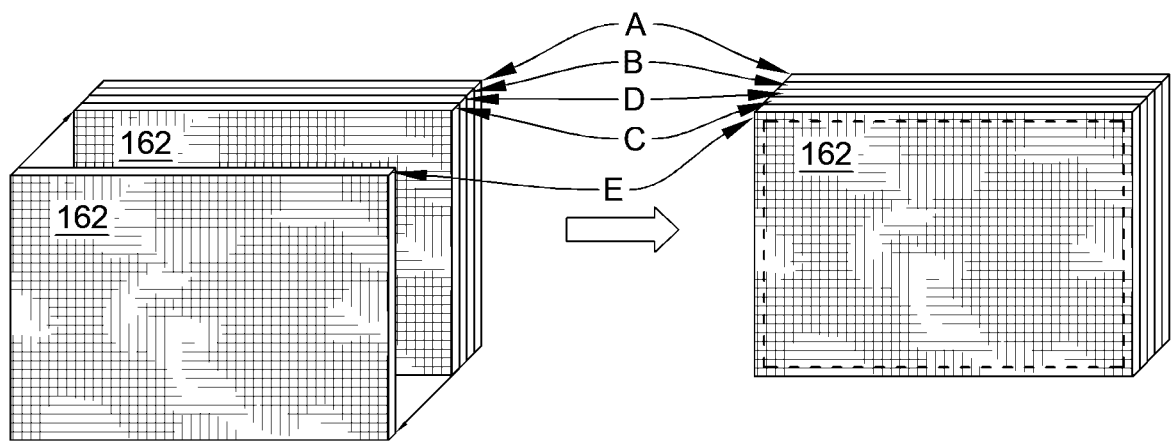

Referring particularly to FIGS. 15 to 17, when three textiles of melt-blown are part of the filtration medium 150, the third melt-blown C is assembled with the weft sides of the most external melt-blown facing away from the core, aka unit. Thus, from the core 170 formed by the first two textiles, the third textile is preferably assembled with its fiber side 164 facing the core 170, or in other words with the structural side 162 facing the closest of the inner layer 102 and the outer layer 104 depending on the position of the textile.

When having four textiles, of the same type or not, (FIG. 16), they are assembled by pair with each pair forming thereby a core 170 wherein for each core 170 the fragile-fiber sides 164 are facing toward each other. The two cores 170 are afterwards assembled structural side 162 to structural side 162, see B to D on FIG. 16.

When more than two textiles must be assembled, they have to be paired so that to maximize the similarities of the fibers in terms of materials, hardness, fineness, length and as many properties as possible on the faces that will be in contact, to reduce as much as possible wear and degradation according to tribology principles.

FIG. 17 depicts when an additional textile E is further added to the filtration medium 150.

Figure 18:
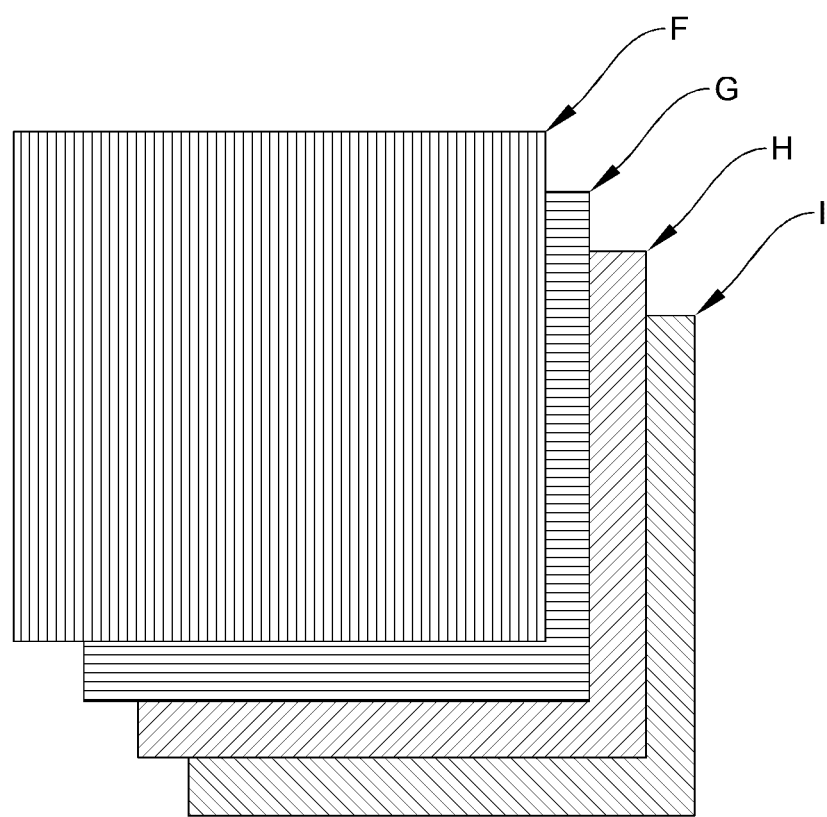
FIG. 18 is a schematic depicting assembly of two to four textiles according to their respective fiber orientation of predominance.
Figure 22:

Referring now to FIG. 18, according to a realization, the textiles of the filtration medium 150 are selected for the fiber orientation of predominance to be oriented in different directions over the supporting weft(s). Accordingly, the combination of textiles composing the filtration medium 150 provides a high level of planar isotropy, absent from the individual textiles displaying on the contrary a high level of anisotropy due to their manufacturing process. As showed by the research and development on the present filtration medium, a higher level of isotropy improves its filtration characteristics and participates in the filtration medium reaching the desired level of filtration over the desired large range of particle sizes. Isotropy is maximized by maximizing the angular divergence between fiber orientations of predominance, as detailed hereinafter in the example.

For instance, during associated research, it has been observed in an exemplary case that the PFE of a first textile having a fiber orientation of predominance was about 80% over particles of a tested size. When using two superposed layers of the first textile with their fiber orientation of predominance aligned, the filtration gain was insignificant, about 3%. However, when the two superposed layers were assembled so that the fiber orientations of predominance were at 90 degrees from each other, the gain was much more substantial, about 5-15% depending on the textile. Therefore, improvement of the isotropy provided by non-alignment of the fiber orientation of predominance showed a substantial impact over the filtration characteristics, and variance of the fiber orientation of predominance was identified as a solution toward that objective. Another observed advantage resides in an improved resistance of the textiles when undergoing forces, particularly under forces transverse to the fiber orientation of predominance.

Referring to FIG. 18, it depicts an example in which up to four textiles displaying high level of anisotropy are assembled as superposed layers wherein angular divergence between fiber orientations of predominance is maximized, resulting in a maximized level of isotropy of the filtration medium with associated improved filtration characteristics. Accordingly, the second textile G has its fiber orientation of predominance (depicted horizontal) at 90 degrees relative to the fiber orientation of predominance of the first textile F (depicted vertical); the third textile H has its fiber orientation of predominance at 45 degrees (depicted upward from left to right) relative to the fiber orientations of predominance of textiles F and G; the fourth textile I has its fiber orientation of predominance (depicted upward from right to left) at 90 degrees relative to the fiber orientation of predominance of the third textile H, and at 45 degrees relative to the fiber orientations of predominance of textiles F and G.

For illustration, FIGS. 19 to 22 show close-up views of fibers of typical melt-blown textiles depicting their respective fiber orientation of predominance, thus observable anisotropy.

Regarding the combination of textile(s) forming a filtration media 150, it should be noted that the selection of the nature of the textiles to reach the desired high-level of isotropy may involve, according to realizations, a single type of textile, e.g., a melt-blown, a textile of another type, or a mix of types of textiles, e.g., a woven textile and a nonwoven textile.

According to a realization, the filtration medium 150 comprises a combination of textiles, e.g., two melt-blown, with the textiles featuring a variety of size of fibers. For example, a first melt-blown comprises a weft of a first fineness with fibers of a first diameter (or a mix or variety of fibers of different diameters), and a second melt-blown of a second fineness with fibers of a second diameter (or a mix or variety of fibers of different diameters). Accordingly, for instance, the first melt-blown provides good filtration characteristics over particles of a range of sizes A (the first melt-blown being well adapted therefor) and the second melt-blown over particles of a range of sizes B (the second melt-blown being well adapted therefor). Research and development on a large number of textiles and textile types shows that the combination of the first and second melt-blown provides good filtration characteristics on particles of all sizes included in ranges A and B.

Similarly, variation in the thickness proves also improvement in the filtration characteristics.

According to realizations, improvement in the level of isotropy may include the use of textiles having mixed fibers of different diameters, aka of a variety of diameters.

According to a realization, one or more of the textiles composing the filtration medium may comprise a mix of fibers of different sizes, e.g., some extra-fine-diameter fibers and some fine-diameter fibers, e.g., melt-blown, on a weft or not.

Referring now to FIG. 13, the filtration medium 150 comprises at least two layers of textiles 152, and preferably two layers of melt-blown layers. When two layers of textiles are of melt-blown type, the filtration medium 150 is preferably assembled such as having the fragile-fiber side 164 facing each other.

According to realizations, the filtration medium 150 of a mask 100, 200 is made according to the examples listed below.

In one exemplary realization, the inner layer 102 is made of a calendered textile, such as nylon micro- or nano-perforated, and a, e.g., nonwoven polymer. The outer layer 104 is made of a calendered textile, such as nylon microperforated or nano-perforated, and a, e.g., nonwoven polymer. The filtration layer 106 comprises a filtration medium 150 comprising a first textile 152a made of melt-blown fabric of between 10 gsm and 50 gsm (gram per square meter), and a second textile 152b made of a nanofibers and/or microfibers, comprising short and long fine fibers of between 10 gsm and 50 gsm (wherein is a melt-blown or a mix of nonwoven and melt-blown). This realization provides an approximative PFE over 75-100 nm particles up to 92% according to ASTM F3502-21/F2100, an approximative PFE up to 85% for the most penetrating particle sizes 20 nm to 4000 nm of NaCl according to BNQ method 19922-900—Appendix A, and a ΔP of 5-8 mm H$_2$O per cm$^2$ according to EN14683:2019 method (not including influence of inner layer 102 and outer layer 104).

In another exemplary realization, the inner layer 102 is made of one of geotextiles and geosynthetics, aka membranes and felts designed for agriculture and horticulture purposes. The outer layer 104 is made of one of geotextiles and geosynthetics. The filtration layer 106 comprises a filtration medium 150 comprising a first textile 152a made of nanofibers and/or microfibers, comprising short and long fine fibers of between 10 gsm and 50 gsm, and a second textile 152b made of a nanofibers and/or microfibers, comprising short and long fine fibers of between 10 gsm and 50 gsm (wherein is a melt-blown or a mix of nonwoven and melt-blown). This realization provides an approximative PFE over 75-100 nm particles up to 95% according to ASTM F3502-21/F2100, an approximative PFE up to 85% for the most penetrating particle sizes 20 nm to 4000 nm of NaCl according to BNQ method 19922-900—Appendix A, and a ΔP of 3-6 mm H$_2$O per cm$^2$ according to EN14683:2019 method (not including influence of inner layer 102 and outer layer 104).

In another exemplary realization, the inner layer 102 is made of one of polyester of nylon or polymer fabrics (knits, felts, nonwoven or woven). The outer layer 104 is made of one of polyester of nylon or polymer fabrics (knits, felts, nonwoven or woven). The filtration layer 106 comprises a filtration medium 150 comprising a first textile 152a made of melt-blown type fabric of between 50 gsm and 90 gsm, and a second textile 152b made of a nanofibers and/or microfibers, comprising short and long fine fibers between 10 gsm and 50 gsm (wherein is a melt-blown or a mix of nonwoven and melt-blown). This realization provides an approximative PFE over 75-100 nm particles up to 94% according to ASTM F3502-21/F2100, an approximative PFE up to 90% for the most penetrating particle sizes 20 nm to 4000 nm of NaCl according to BNQ method 19922-900—Appendix A, and a ΔP of 6-9 mm H$_2$O per cm$^2$ according to EN14683:2019 method (not including influence of inner layer 102 and outer layer 104).

Another exemplary realization consists of a mask 100, 200 comprising an inner layer 102 made of a fabric of cotton and/or polyester and/or nylon and/or hemp and/or milkweed and/or linen as examples. The outer layer 104 is made of a fabric of cotton and/or polyester and/or nylon and/or hemp and/or milkweed and/or linen as examples. The filtration layer 106 comprises a filtration medium 150 comprising a first textile 152a made of a nanofibers and/or microfibers, comprising short and long fine fibers between 10 gsm and 50 gsm (wherein is a melt-blown or a mix of nonwoven and melt-blown) or melt-blown type fabric of between 50 gsm and 90 gsm, a second textile 152b made of nanofibers and/or microfibers, comprising short and long fine fibers between 10 gsm and 50 gsm (wherein is a melt-blown or a mix of nonwoven and melt-blown) of nanofibers and/or microfibers, comprising short and long fine fibers of between 10 gsm and 50 gsm (wherein is a melt-blown or a mix of nonwoven and melt-blown), and a third textile 152c made of felts (nonwoven) short and long fibers of between 50 gsm and 250 gsm. This realization provides an approximative PFE over 75-100 nm particles up to 96% according to ASTM F3502-21/F2100, an approximative PFE up to 91% for the most penetrating particle sizes 20 nm to 4000 nm of NaCl according to BNQ method 19922-900—Appendix A, and a ΔP of 5-8 mm H$_2$O per cm$^2$ according to EN14683:2019 method (not including influence of inner layer 102 and outer layer 104).

Another exemplary realization comprises a filtration layer 106 comprising a filtration medium 150 comprising a first textile 152a made of a specialized particulate filter and/or ventilation system filters and MERV type filters (different gauges and weights depending of fabrication), and a second textile 152b made of an industrial type of paper-textile (cellulose and/or polyester and/or polypropylene), e.g., wipes (of different gauges and weight depending on fabrication). This realization provides an approximative PFE over 75-100 nm particles up to 80% according to ASTM F3502-21/F2100, an approximative PFE up to 86% for the most penetrating particle sizes 20 nm to 4000 nm of NaCl according to BNQ method 19922-900—Appendix A, and a $\Delta P$ of 5-9 mm $H_2O$ per $cm^2$ according to EN14683:2019 method (not including influence of inner layer 102 and outer layer 104).

According to another exemplary realization, the filtration layer 106 comprises up to four textiles 152a-d of nanofibers and/or microfibers of short and long fine fibers between 10 gsm and 50 gsm, alone or in combination with one textile 152 made either of a calendered nylon micro- or nanoperforated, or alternatively of an industrial type of paper-textiles, or alternatively of felts with short and long fibers between 50 gsm and 250 gsm with a $\Delta P$ between 4-9 mm $H_2O$ per $cm^2$ according to EN14683:2019 method Distribution According to embodiments, the barrier masks 100, 200 are manufactured as described before and distributed with or without the option of replacing the filtration layer 106.

According to an embodiment, the barrier masks 100, 200 may be distributed as a kit comprising a combination of (either not marked or pre-cut) textile for the inner layer 102, (either not marked or pre-cut) textile for the outer layer 104, filtration layers 106 made of filtration medium, ear loops or elastic band around the head 108 and instructions for assembling the components into barrier masks 100.

According to another embodiment, the kits may be limited to the filtration layers 106 made of filtration medium and instructions since the inner layer 102 and the outer layer 104 may be made of materials commonly available in a household such as cotton (which however leads to variation of breathability).

Wearing Method

The method of use of the barrier mask 100, 200 typically consists in placing the barrier mask 100, 200 over the mouth and nostrils of the wearer, in placing and adjust the ear loops or elastic band around the head 108 correctly such that the barrier mask 100, 200 remains in place and to adjust the edges of the barrier mask 100, 200, particularly around the nose and under the chin, such that the barrier mask 100, 200 fits well the shape of the face of the wearer, thus hindering the passageway of biological pathogens and particles through these apertures.

An alternative method of use consists in wearing the barrier mask 100, 200 over another mask, such as a chirurgical mask or other types of masks such as the ones classified according to ASTM levels, and particularly over masks that are in the N95 category (respirators).

Alternative Uses

Although the present filtration medium 150 has been described particularly in relation with its use in barrier masks 100, 200, other applications of the present filtration medium 150 comprises use as filters of mechanical (air-forced) air-filtration devices such as ventilation devices, air-exchangers, HVAC devices, vehicle air control systems, dust/smoke/allergen (e.g., pollen) controlling devices and filtration devices, pollution controlling devices, etc. Other uses include the integration of the filtration medium 150 in other respiratory devices such as other types of inhaling devices and masks (e.g., masks with filter housings, full-face masks), and garments/clothes/PPE such as gowns, laboratory coats, aprons, scarfs, bandanas, hats, and neck gaiters.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An air-filtration medium for filtering particles in the air, the particles being within a range of particle sizes, the air-filtration medium comprising:
    a first piece of nonwoven textile having a first fiber orientation of predominance, a first structural side and a first fragile-fiber side, the first piece of nonwoven textile being anisotropic and being plastically unstretched; and
    a second piece of nonwoven textile having a second fiber orientation of predominance, a second structural side and a second fragile-fiber side, the second piece of nonwoven textile being anisotropic and being plasticly unstretched;
    wherein the first piece of nonwoven textile is superposed to the second piece of nonwoven textile with the first fragile-fiber side facing the second fragile-fiber side and with the first fiber orientation of predominance being non-aligned by at least 10 degrees from the second fiber orientation of predominance, the first and second pieces of non-woven textiles being sealed together along a peripheral edge thereof, thereby defining an enclosure in-between;
    wherein the first fragile-fiber side and the second fragile-fiber side correspond to a side of projected fibers during the manufacturing process of the first and second pieces of non-woven textiles, the first and second fragile-fiber sides having fibers that are more sensible to detachment than fibers on the respective first and second structural fiber sides; and
    wherein fibers of the first fragile-side and of the second fragile-fiber side are enclosed in the enclosure.

2. The air-filtration medium of claim 1, wherein the air-filtration medium has a loss over its filtration characteristics of less than 45% after 50 cleaning cycles.

3. The air-filtration medium of claim 1, wherein the first piece of nonwoven textile is selected from the group consisting of:
    a nonwoven textile of between 10 gsm and 50 gsm or 51 gsm and 90 gsm;
    a melt-blown textile of between 10 gsm and 50 gsm or 51 gsm and 90 gsm;
    a textile of nanofibers, microfibers or combination thereof of between 10 gsm and 50 gsm or 51 gsm and 90 gsm comprising short and long fine fibers;
    nonwoven felt of short fibers, long fibers or combination thereof of between 40 gsm and 300 gsm;
    a calendered nylon micro- or nanoperforated textile and/or polymer; and
    a paper-textile made of at least one of cellulose, polyester and polypropylene.

4. The air-filtration medium of claim 1, wherein fibers of the first piece of nonwoven textile and fibers of the second piece of nonwoven textile are of a variety of diameters and lengths.

5. The air-filtration medium of claim 1, wherein the air-filtration medium has a loss over its filtration characteristics of less than 50% after 100 cleaning cycles.

6. A barrier mask adapted to be placed over a wearer's face in front of the wearer's mouth and nostrils for filtration of particles including biological pathogens, the barrier mask comprising:
- at least one of a mask inner layer or a mask outer layer:
- a filtration layer comprising the air-filtration medium of claim 1, the filtration layer and at least one of the mask inner layer and the mask outer layer being superposed and sealed together to form the barrier mask; and
- at least one of a fastening member selected from the group consisting of ear loops and elastic band adapted to rest on a wearer's head which fastening member is attached to the barrier mask and adapted to maintain the same over the wearer's face for filtration of the particles therethrough.

7. The air-filtration medium of claim 1, further comprising at least a third piece of textile
- having a third fragile-fiber side superposed and facing the first structural fiber side of the first piece of nonwoven textile.

8. The air-filtration medium of claim 1, further comprising a third piece of textile and a fourth piece of textile;
- the third piece of textile having a third fragile-fiber side facing and superposed on a fourth fragile-fiber side or on a fourth structural fiber side of the fourth piece of textile and forming together a unit of two superposed pieces of textiles which unit is superposed on the first structural fiber side or is positioned in between the first and second fragile-fiber sides.

9. An air-filtration device mounted to an air-forced mechanical filtration device for filtration of particles in air, comprising the air-filtration medium of claim 1.

10. The air-filtration medium of claim 1, further comprising a third piece of textile comprising a protective weft adjoined and superposed to the first piece of nonwoven textile.

11. The air-filtration medium of claim 1, featuring a pressure loss of less than 8.55 mm H20 per cmz2.

12. A piece of cloth, a garment or a garment accessory comprising the air-filtration medium of claim 1.

13. The air-filtration medium of claim 1, wherein the first piece of nonwoven textile and the second piece of nonwoven textile are sealed together by one of sewing, peripheral binding, glue, thermofusion and ultrasound fusion.

14. The air-filtration medium of claim 1, wherein the air-filtration medium has a loss over its filtration characteristics of less than 40% after 25 cleaning cycles.

15. A method of making a filtration layer for filtration of particles in the air, comprising:
- superimposing a first piece of nonwoven textile and a second piece of nonwoven textile each having a fiber orientation of predominance with their fiber orientations of predominance being non-aligned relative to each other of at least 10 degrees, the first piece of nonwoven textile and the second piece of nonwoven textile not having been object of stretching inducing a plastic deformation, the first piece of nonwoven textile and the second piece of nonwoven textile defining together an air-filtration medium of better isotropy than any one of the first piece of nonwoven textile and the second piece of nonwoven textile alone.

16. The method of claim 15, wherein the first piece of nonwoven textile and the second piece of nonwoven textile are of same or different textiles.

17. The method of claim 15, wherein the first piece of nonwoven textile is a nonwoven having a Structural side and a fragile-fiber side, and wherein the fragile-fiber side of the first piece of nonwoven textile faces the fragile-fiber side of the second piece of nonwoven textile.

\* \* \* \* \*